United States Patent
Fang et al.

(10) Patent No.: US 11,295,761 B2
(45) Date of Patent: Apr. 5, 2022

(54) METHOD FOR CONSTRUCTING VOICE DETECTION MODEL AND VOICE ENDPOINT DETECTION SYSTEM

(71) Applicant: YEALINK (XIAMEN) NETWORK TECHNOLOGY CO., LTD., Xiamen (CN)

(72) Inventors: Zehuang Fang, Xiamen (CN); Yuanxun Kang, Xiamen (CN); Wanjian Feng, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 50 days.

(21) Appl. No.: 16/871,906

(22) Filed: May 11, 2020

(65) Prior Publication Data
US 2020/0365173 A1    Nov. 19, 2020

(30) Foreign Application Priority Data
May 13, 2019    (CN) .......................... 201910394746.8

(51) Int. Cl.
  *G10L 15/16*    (2006.01)
  *G10L 25/87*    (2013.01)

(52) U.S. Cl.
  CPC .............. *G10L 25/87* (2013.01); *G10L 15/16* (2013.01)

(58) Field of Classification Search
  CPC ................................ G10L 25/87; G10L 15/16
  USPC ......................................................... 704/253
  See application file for complete search history.

(56) References Cited

U.S. PATENT DOCUMENTS

2020/0342890 A1* 10/2020 Ma ........................... G10L 25/78
2020/0349950 A1* 11/2020 Yoshioka .............. G10L 15/083
2021/0056984 A1*  2/2021 Zhang ....................... G06N 3/08

OTHER PUBLICATIONS

Y. Yun, J. Jung, S. Eun, S. Cha and S. So, "Voice Conversion of Synthesized Speeches Using Deep Neural Networks," 2019 International Conference on Green and Human Information Technology (ICGHIT), 2019, pp. 93-96, doi: 10.1109/ICGHIT.2019.00029. (Year: 2019).*

(Continued)

*Primary Examiner* — Bharatkumar S Shah (57) ABSTRACT

The present disclosure discloses a method for constructing a voice detection model and a voice endpoint detection system, and belongs to the technical field of voice recognition. In the method for constructing a voice detection model according to the present disclosure, audio data is first collected and a mixed voice is synthesized, feature extraction is performed on the mixed voice to obtain a 62-dimensional feature, and then the 62-dimensional feature is input to a recurrent neural network (RNN) model for training to obtain a voice detection model. The voice endpoint detection system according to the present disclosure includes a collecting unit, a calculating unit, a transmitting unit, and a terminal, the collecting unit being electrically connected to the calculating unit, and the calculating unit and the terminal being respectively connected to the transmitting unit. The voice detection model can be applied to a real-time conference communication device.

16 Claims, 5 Drawing Sheets

(56) References Cited

OTHER PUBLICATIONS

S. P. Todkar, S. S. Babar, R. U. Ambike, P. B. Suryakarand J. R. Prasad, "Speaker Recognition Techniques: A Review," 2018 3rd International Conference for Convergence in Technology (I2CT), 2018, pp. 1-5, doi: 10.1109/I2CT.2018.8529519. (Year: 2018).*

Y. Yun, J. Jung, S. Eun, S. Cha and S. So, "Voice Conversion of Synthesized Speeches Using Deep Neural Networks," 2019 International Conference on Green and Human Information Technology (ICGHIT), 2019, pp. 93-96, doi: 10.1109/ICGHIT.2019.00029. (Year: 2019) (Year: 2019).*

S. P. Todkar, S. S. Babar, R. U. Ambike, P. B. Suryakarand J. R. Prasad, "Speaker Recognition Techniques: A Review," 2018 3rd International Conference for Convergence in Technology (I2CT), 2018, pp. 1-5, doi: 10.1109/I2CT.2018.8529519. (Year: 2018) (Year: 2018).*

\* cited by examiner

METHOD FOR CONSTRUCTING VOICE DETECTION MODEL AND VOICE ENDPOINT DETECTION SYSTEM

RELATED APPLICATION

This application claims priority to Chinese Application Number 201910394746.8, filed on May 13, 2019, which is herein incorporated by reference.

BACKGROUND

Technical Field

The present disclosure relates to the field of voice recognition, and more specifically, to a method for constructing a voice detection model and a voice endpoint detection system.

Related Art

Voice activity detection (VAD) is also referred to as voice endpoint detection and is detecting whether there is a voice in a noise environment, and is usually applied to a voice processing systems such as voice coding and voice enhancement, to reduce a voice coding rate, save communication bandwidth, reduce energy consumption of a mobile device, and increase a recognition rate. There are two problems that need to be paid attention to during voice endpoint detection by using a traditional algorithm:

1. Background noise, that is, how to detect a voice in loud background noise.
2. Front and back cutting, that is, when restoring a voice, there is a specific judgment threshold and delay from the beginning of actual speech to detection of the voice. Sometimes, the beginning and end of a voice waveform is discarded as a non-voice, and the restored voice changes. Therefore, a voice packet needs to be added before or after a burst voice packet for smoothing.

Accuracy of the VAD algorithm is critical to a voice front-end algorithm. A traditional VAD algorithm usually includes two parts: feature extraction and voice/non-voice determination. Commonly used feature extraction is divided into five categories: energy, frequency domain, inverted spectrum, harmonic, and long-term information. Voice/non-voice determination is designed according to a characteristic of a respective extracted feature, and is commonly based on a threshold, a long-term envelope, a fundamental frequency, and the like. However, the traditional VAD algorithm is often dependent on an environment and a signal-to-noise ratio, and accuracy cannot be guaranteed, which is very unfavorable for use in a real-time conference communication device.

In recent years, due to the development of deep learning, technologies for VAD detection through deep learning have begun to appear. Compared with the traditional algorithm, a nonlinear fitting ability of deep learning is extremely strong, and more mature deep learning models such as a recurrent neural network (RNN), a long-short term memory (LSTM), and a gated recurrent unit (GRU) are also very suitable for serial input data such as an audio signal. However, a parameter scale and calculation overheads of deep learning are usually large, and direct use of a small model cannot guarantee stability and effects of the algorithm. Therefore, it is difficult to apply voice recognition to a real-time conference communication device.

In view of the above, how to improve accuracy and stability of voice recognition is a problem that needs to be urgently resolved in the prior art.

SUMMARY

1. To-be-Resolved Problem

In order to overcome the shortcomings in the prior art that accuracy and stability of voice recognition are not high and it is difficult to apply voice recognition to a real-time conference communication device, the present disclosure provides a method for constructing a voice detection model and a voice endpoint detection system, so that voice data in the case of various types of noise has a high recognition rate, and the voice detection model can be applied to a real-time conference communication device.

2. Technical Solution

In order to resolve the foregoing problem, the technical solutions adopted by the present disclosure are as follows:

In the method for constructing a voice detection model according to the present disclosure, audio data is first collected and a mixed voice is synthesized, feature extraction is performed on the mixed voice to obtain a 62-dimensional feature, and then the 62-dimensional feature is input to an RNN model for training to obtain a voice detection model.

Further, specific steps are as follows:

Step 1. Mixed Voice Synthesis

A pure voice and noise are collected first, and then the collected pure voice and noise are synthesized to obtain the mixed voice.

Step 2. Feature Extraction

Windowing and framing are performed on the mixed voice first and short-time Fourier transform is performed, a frequency domain log spectrum of each frame is calculated, and then feature extraction is performed on the log spectrum to obtain the 62-dimensional feature.

Step 3. Generation of the Voice Detection Model

The 62-dimensional feature is input to the RNN model, and then an Adam training strategy and an improved loss function are used for training to obtain the voice detection model, where the improved loss function is as follows:

$$BCE_{min}(x)_i = 0.1 \times MC(x) \times [y_i \log f_i(x) + (1-y_i)\log(1-f_i(x))]$$

$BCE_{min}(x)_i$ represents a binary cross entropy, $f_i(x)$ represents a predicted result, $y_i$ represents a true label, and $MC(x)$ represents a minimum expected cost whose formula is as follows:

$$MC(x) = P(pre_{L0}, ture_{L1}, x) \times C10 + P(pre_{L1}, ture_{L0}, x) \times C0$$

In the formula, pre represents a predicted result; tore represents a true label; $P(pre_{L0}, ture_{L1}, x)$ represents a ratio of a number of true labels L1, predicted as L0, to a total number, L1 being a voice label, and L0 being a non-voice label; $P(pre_{L1}, true_{L0}, x)$ represents a ratio of a number of true labels L0, predicted as L1, to the total number; C10 is a cost when a true label L1 is detected as L0; and C0 is a cost when a true label L0 is detected as L1.

Further, a formula for voice synthesis in step 1 is as follows:

$$S_{mix} = \alpha \times S_{clean} + \beta \times N$$

$S_{mix}$ represents the synthesized mixed voice; $S_{clean}$ represents the pure voice; N represents the noise; a represents an attenuation coefficient of the pure voice, $0.3 \leq \alpha \leq 1$; and $\beta$ represents an attenuation coefficient of the noise, $0.3 \leq \beta \leq 1$.

Further, the performing feature extraction on the log spectrum in step 2 specifically includes: dividing the log spectrum into 22 sub-bands evenly, performing discrete cosine transform (DCT) on each sub-band to obtain a 22-dimensional feature, comparing a data feature of a current frame with data features of previous two frames of the current frame and next two frames of the current frame according to the 22-dimensional feature to obtain a 36-dimensional feature according to the feature of the current frame, using a spectral distance difference calculated by using a pitch period, a spectral distance of the current frame, the current frame, and the previous two frames separately as features to obtain a 4-dimensional feature, and finally obtaining the 62-dimensional feature.

Further, a formula for the Adam training strategy in step 3 is as follows:

$$m_t = \mu \times m_{t-1} + (1 - \mu) \times g_t$$

$$n_t = \rho \times n_{t-1} + (1 - \rho) \times g_t^2$$

$$\hat{m}_t = \frac{m_t}{1 - \mu}$$

$$\hat{n}_t = \frac{n_t}{1 - \rho}$$

$$\theta_{t+1} = \theta_t - \frac{\hat{m}_t}{\sqrt{\hat{n}_t} + \epsilon}$$

$g_t$ represents a gradient; $m_t$ represents a first-order momentum of the gradient; $m_{t-1}$ represents a first-order momentum of the gradient at a moment $t-1$; $n_t$ represents a second-order momentum of the gradient; $n_{t-1}$ represents a second-order momentum of the gradient at the moment $t-1$; $\hat{m}_t$ represents a correction to $m_t$; $\hat{n}_t$ represents a correction to $n_t$; $\theta$ represents a learning rate; $\mu$ and $\rho$ represent attenuation coefficients, $0 \leq \mu < 1$, and $0 \leq \rho < 1$; and $\epsilon$ is a constant, $\epsilon = 10^{-8}$.

Further, coefficients of the first six frequency bands are used as a 6-dimensional feature for difference comparison, a calculation formula for difference comparison being as follows:

$$F1 = (f_{current}(i) + f_{current+1}(i) + f_{current+2}(i))/3$$

$$F2 = f_{current}(i) - f_{current+2}(i)$$

$$F3 = f_{current}(i) - 2 \times f_{current+1}(i) + f_{current+2}(i)$$

$$F4 = f_{current}(i) - f_{current-1}(i)$$

$$F5 = f_{current}(i) - f_{current-2}(i)$$

$$F6 = f_{current}(i)$$

$f_{current}$ represents the current frame; $f_{current+1}$ represents a next frame of the current frame; $f_{current+2}$ represents a next frame of $f_{current+1}$; $f_{current-1}$ represents a previous frame of the current frame; $f_{current-2}$ represents a previous frame of $f_{current-1}$; represents an index corresponding to the 22-dimensional feature, $1 \leq i \leq 6$; F1 to F5 represent five difference comparison manners; and F6 represents the feature of the current frame.

Further, the RNN model includes a Dense layer of 16 neurons and a GRU layer of 24 outputs.

The voice endpoint detection system according to the present disclosure includes a collecting unit, a calculating unit, a transmitting unit, and a terminal, the collecting unit being electrically connected to the calculating unit, and the calculating unit and the terminal being respectively connected to the transmitting unit, where the calculating unit includes a memory and a processor, the memory storing a program for implementing the method for constructing a voice detection model, and the processor being configured to execute the program to obtain the voice detection model and calculate the voice detection model.

Further, the collecting unit includes a sound collector and a signal converter, the sound collector being electrically connected to the signal converter, and the signal converter being electrically connected to the calculating unit.

3. Beneficial Effect

Compared with the prior art, the beneficial effects of the present disclosure are as follows:

In the method for constructing a voice detection model according to the present disclosure, the voice detection model trained by using the RNN model is not only small in scale but also has good stability, thereby improving robustness of the model and enabling the voice detection model to be applied to a real-time conference communication device. In the voice endpoint detection system according to the present disclosure, voice data in the case of various types of noise has a high recognition rate, so that real-time communication can be achieved.

Reference numerals: 100. Collecting unit; 200. Calculating unit; 300. Transmitting unit; 400. Terminal.

DETAILED DESCRIPTION

In order to make the objectives, technical solutions, and advantages of the present disclosure more comprehensible, the technical solutions according to embodiments of the present disclosure are clearly and completely described in the following with reference to the accompanying drawings. Apparently, the embodiments in the following description are merely some rather than all of the embodiments of the present disclosure. Moreover, the various embodiments are not relatively independent, and may be combined with each other as needed to achieve a better effect. Therefore, the following detailed description of the embodiments of the present disclosure provided in the accompanying drawings is not intended to limit the protection scope of the present disclosure, but merely represents selected embodiments of the present disclosure. All other embodiments obtained by a person of ordinary skill in the art based on the embodiments of the present disclosure without creative efforts shall fall within the protection scope of the present disclosure.

For further understanding of the present disclosure, the present disclosure is described in detail with reference to the accompanying drawings and embodiments.

Embodiment 1

Figure 1:
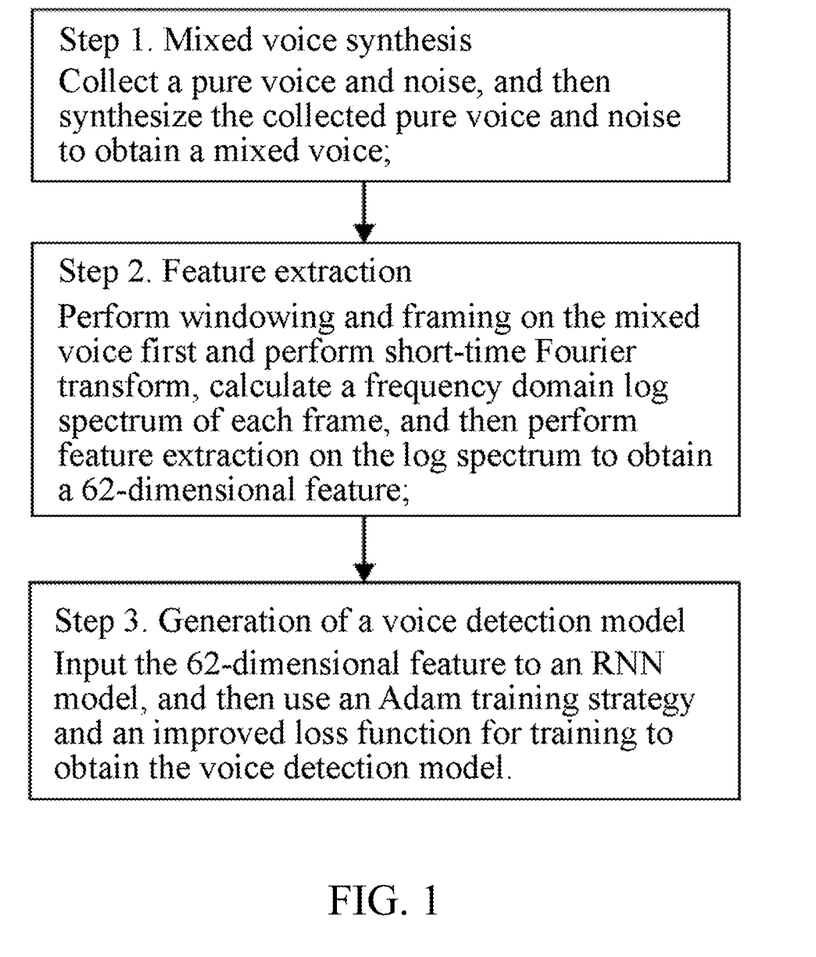
FIG. 1 is a schematic flowchart of a method for constructing a voice detection model according to the present disclosure.

Referring to FIG. 1, in a method of constructing a voice detection model according to the present disclosure, audio data is first collected and a mixed voice is synthesized, feature extraction is performed on the mixed voice to obtain a 62-dimensional feature, and then the 62-dimensional feature is input to an RNN model for training to obtain a voice detection model. It should be noted that the voice detection model is a trained RNN model. An RNN model is small but unstable, but the trained RNN model is not only small in scale and has good stability, so that the voice detection model can be applied to a real-time conference communication device.

The method of constructing a voice detection model according to the present disclosure specifically includes the following steps:

Step 1. Mixed Voice Synthesis

Figure 2:
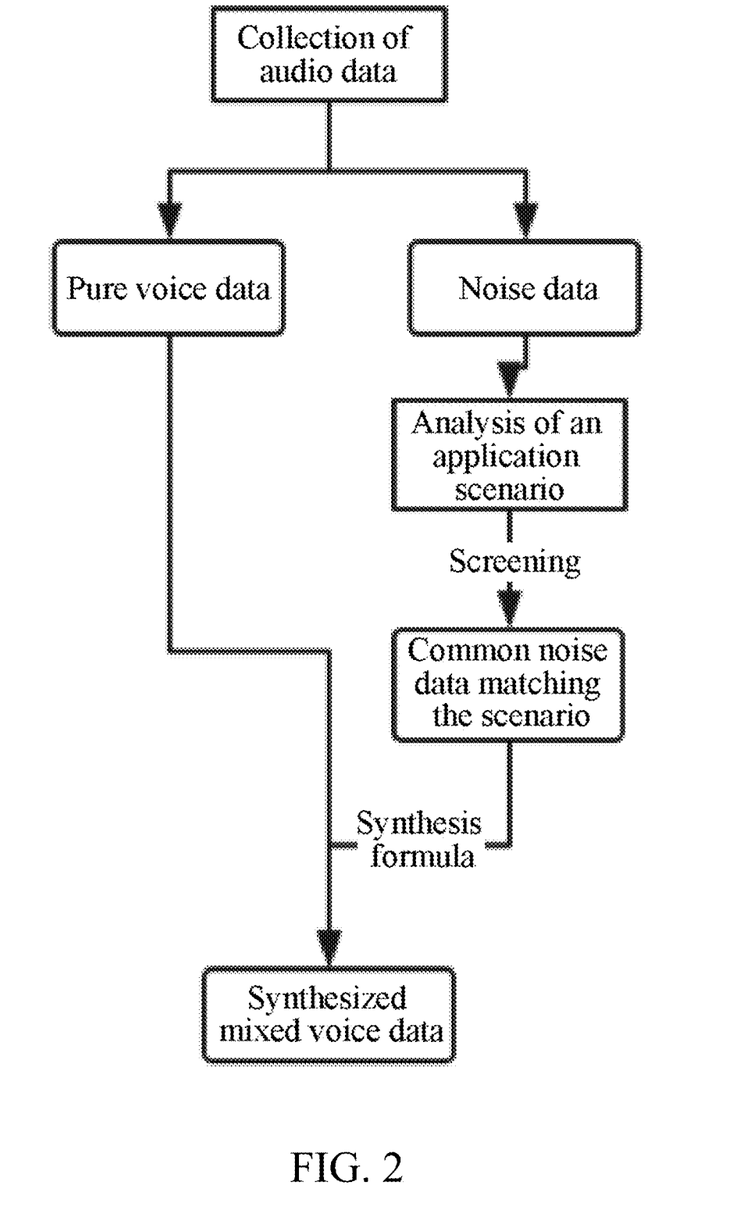
FIG. 2 is a schematic flowchart of synthesizing a mixed voice according to the present disclosure.

As shown in FIG. 2, a pure voice and noise are collected first, and then the collected pure voice and noise are synthesized to obtain the mixed voice. It should be noted that voice data can be accurately and massively labelled through the synthesized mixed voice. In particular, a pure voice in an anechoic room is first collected and noise in various scenarios such as a train stations, a street, a park, a basketball court, a stadiums, an office, and a ringtone recording is collected, and the collected noise is screened out to select common noise data matching the scenario. It should be noted that a microphone is used for recording collection in this embodiment. Then, voice synthesis is performed on the collected pure voice and noise to obtain a mixed voice, and a formula for voice synthesis is as follows:

$$S_{mix} = \alpha \times S_{clean} \beta \times N$$

$S_{mix}$ represents the synthesized mixed voice; $S_{clean}$ represents the pure voice; N represents the noise; $\alpha$ represents an attenuation coefficient of the pure voice, $0.3 \leq \alpha \leq 1$; and $\beta$ represents an attenuation coefficient of the noise, $0.3 \leq \beta \leq 1$. In this embodiment, $\alpha=0.5$ and $\beta=0.6$.

Step 2. Feature Extraction

Windowing and framing are performed on the mixed voice first and short-time Fourier transform is performed, a frequency domain log spectrum of each frame is calculated, and then feature extraction is performed on the log spectrum to obtain the 62-dimensional feature. In particular, the log spectrum is divided into 22 sub-bands evenly, DCT is performed on each sub-band to obtain a 22-dimensional feature, a data feature of a current frame is compared with data features of previous two frames of the current frame and next two frames of the current frame according to the 22-dimensional feature to obtain a 36-dimensional feature according to the feature of the current frame, a spectral distance difference calculated by using a pitch period, a spectral distance of the current frame, the current frame, and the previous two frames separately is used as features to obtain a 4-dimensional feature, and the 62-dimensional feature is finally obtained. The 22-dimensional feature is a coefficient obtained by performing DCT on the 22 sub-bands.

It should be noted that a formula for DCT is as follows:

$$F(u) = c(u) \sum_{i=0}^{N-1} f(i) \cos\left[\frac{(2i+1)\pi}{2N} u\right]$$

$$c(u) = \begin{cases} \sqrt{\frac{1}{N}}, & u = 0 \\ \sqrt{\frac{2}{N}}, & u \neq 0 \end{cases}$$

N represents a total length of data, u represents a compensation factor and a value of u is 1 in this embodiment, c(u) represents a coefficient that enables a DCT matrix to be an orthogonal matrix, f(i) represents sub-band data, and i represents an index of data.

A specific process of difference comparison is as follows: Coefficients of the first six frequency bands are used as a 6-dimensional feature for difference comparison, a calculation formula for difference comparison being as follows:

$$F1 = (f_{current}(i) + f_{current+1}(i) + f_{current+2}(i))/3$$

$$F2 = f_{current}(i) - f_{current+2}(i)$$

$$F3 = f_{current}(i) - 2 \times f_{current+1}(i) + f_{current+2}(i)$$

$$F4 = f_{current}(i) - f_{current-1}(i)$$

$$F5 = f_{current}(i) - f_{current-2}(i)$$

$$F6 = f_{current}(i)$$

$f_{current}$ represents the current frame; $f_{current+1}$ represents a next frame of the current frame; $f_{current+2}$ represents a next frame of $f_{current+1}$; $f_{current-1}$ represents a previous frame of the current frame; $f_{current-2}$ represents a previous frame of $f_{current-1}$; i represents an index corresponding to the 22-dimensional feature, $1 \leq i \leq 6$; F1 to F5 represent five difference comparison manners; and F6 represents the feature of the current frame.

Step 3. Generation of the Voice Detection Model

The 62-dimensional feature is input to the RNN model, and then an Adam training strategy and an improved loss function are used for training to obtain the voice detection model, where a model learning rate is 0.0001, and a formula for the improved loss function is as follows:

$$BCE_{min}(x)_i = 0.1 \times MC(x) \times [y_i \log f_i(x) + (1-y_i) \log(1-f_i(x))]$$

$BCE_{min}(x)_i$ represents a binary cross entropy, $f_i(x)$ represents a predicted result is specifically an output result of the RNN model, $y_i$ represents a true label, and MC(x) represents a minimum expected cost whose formula is as follows:

$$MC(x) = P(pre_{L0}, ture_{L1}, x) \times C10 + P(pre_{L1}, true_{L0}, x) \times C0$$

In the formula, x represents an input value of the RNN model, namely, the 62-dimensional feature; pre represents a predicted result; true represents a true label; $P(pre_{L0}, ture_{L1}, x)$ represents a ratio of a number of true labels L1, predicted as L0, to a total number, L1 being a voice label, and L0 being a non-voice label; $P(pre_{L1}, true_{L0}, x)$ represents a ratio of a number of true labels L0, predicted as L1, to the total number; C10 is a cost when a true label L1 is detected as L0; and C0 is a cost when a true label L0 is detected as L1. It should be noted that in an actual application scenario, costs of a missed detection rate are much greater than costs of a false detection rate. In the present disclosure, a minimum cost theory based on the premise of reducing the missed detection rate is used to improve a loss function, which is more in line with the actual application scenario. The missed detection rate means that an original voice is detected as noise, and the false detection rate means that original noise is detected as a voice.

It should be noted that a formula for the Adam training strategy is as follows:

$$m_t = \mu \times m_{t-1} + (1-\mu) \times g_t$$
$$n_t = \rho \times n_{t-1} + (1-\rho) \times g_t^2$$
$$\hat{m}_t = \frac{m_t}{1-\mu}$$
$$\hat{n}_t = \frac{n_t}{1-\rho}$$
$$\theta_{t+1} = \theta_t - \frac{\hat{m}_t}{\sqrt{\hat{n}_t} + \epsilon}$$

$g_t$ represents a gradient; $m_t$ represents a first-order momentum of the gradient; $m_{t-1}$ represents a first-order momentum of the gradient at a moment t−1; $n_t$ represents a second-order momentum of the gradient; $n_{t-1}$ represents a second-order momentum of the gradient at the moment t−1; $\hat{m}_t$ represents a correction to $m_t$; $\hat{n}_t$ represents a correction to $n_t$; $\theta$ represents a learning rate; $\theta_{t+1}$ represents a learning rate at the moment t−1; $\theta_t$ represents a learning rate at a moment t; $\mu$ and $\rho$ represent attenuation coefficients, $0 \le \mu < 1$, and $0 \le \rho < 1$, where $\mu=0.9$ and $\rho=0.999$ in this embodiment; and E is a small constant for numerical stability, $\epsilon=10^{-8}$.

Figure 3:
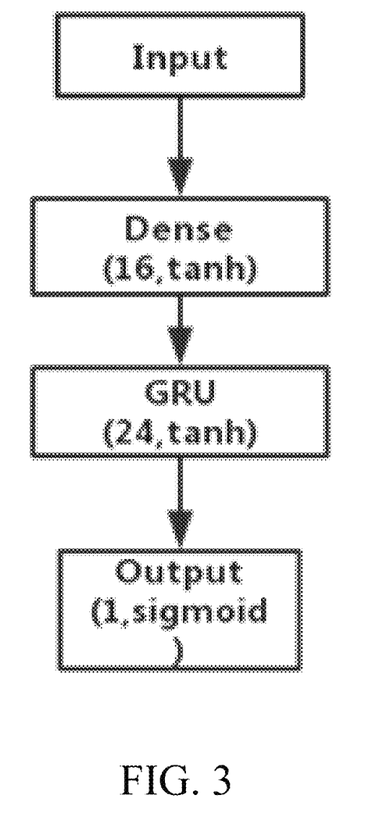
FIG. 3 is a schematic diagram of an RNN model according to the present disclosure.

In addition, it should be further noted that the RNN model in the present disclosure includes a Dense layer (a fully connected layer) of 16 neurons and a GRU layer of 24 outputs, and an output value of the RNN model is output, where 0≤output≤1 (as shown in FIG. 3).

Then, the obtained voice prediction model is used to predict data. When the output value output≥p, the data is a voice; when output<p, the data is a not a voice, 0<p<1, and p is 0.5 in this embodiment.

Parameters of the voice detection model in the present disclosure mainly include weights of an input layer and the Dense layer, weights of the Dense layer and a GRU layer, and weights of the GRU layer and an output layer. A forward algorithm is designed and optimized according to a model structure. In particular, arrays of an equal size are defined according to a number of weights and a connection between layers, and a corresponding data structure is designed according to inputs and outputs of neurons of the Dense layer and the GRU layer to store parameters, so that the voice detection model can be stored in the memory and can be further deployed in a real-time conference communication device.

Figure 4:
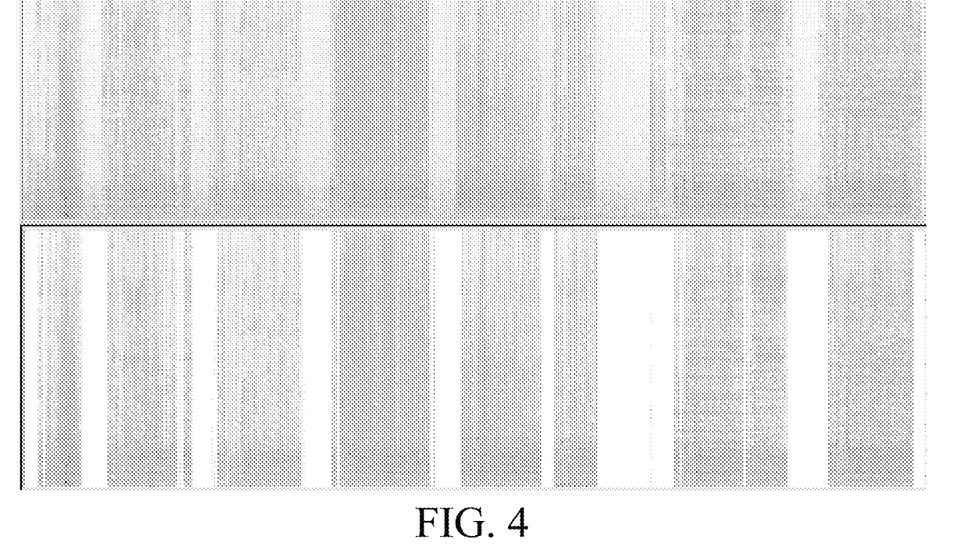
FIG. 4 is a schematic diagram of voice detection in the case of normal background noise in Embodiment 1.
Figure 5:
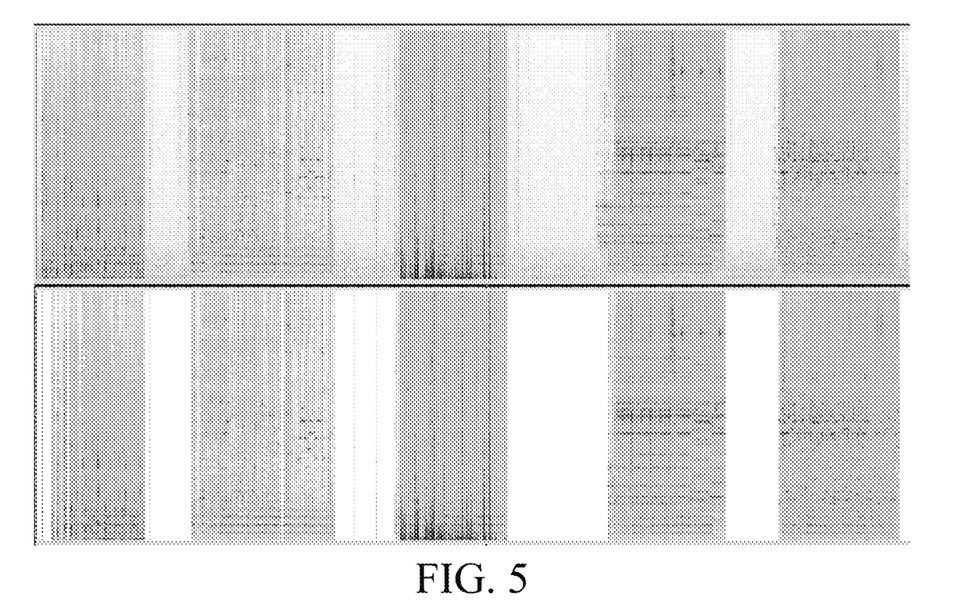
FIG. 5 is a schematic diagram of voice detection in the case of a plurality of types of noise in Embodiment 1.
Figure 6:
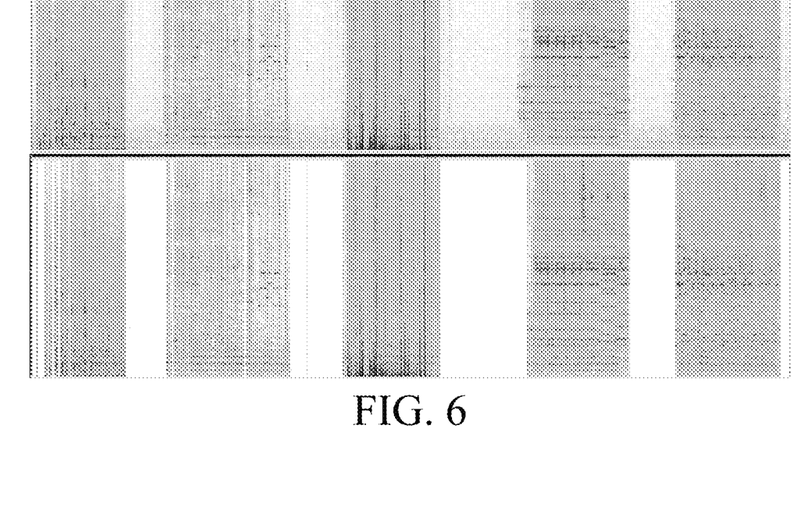
FIG. 6 is a schematic diagram of voice detection in the case of noise with a low signal-to-noise ratio in Embodiment 1.

The voice detection model constructed by using the foregoing method has a high recognition rate for voice data in the case of various types of noise, and robustness of the voice detection model is high. As shown in FIG. 4, FIG. 5, and FIG. 6, the voice detection model can detect and recognize a voice in the case of normal background noise, a voice in the case of various types of noise, and a voice in the case of noise with a low signal-to-noise ratio.

Figure 7:
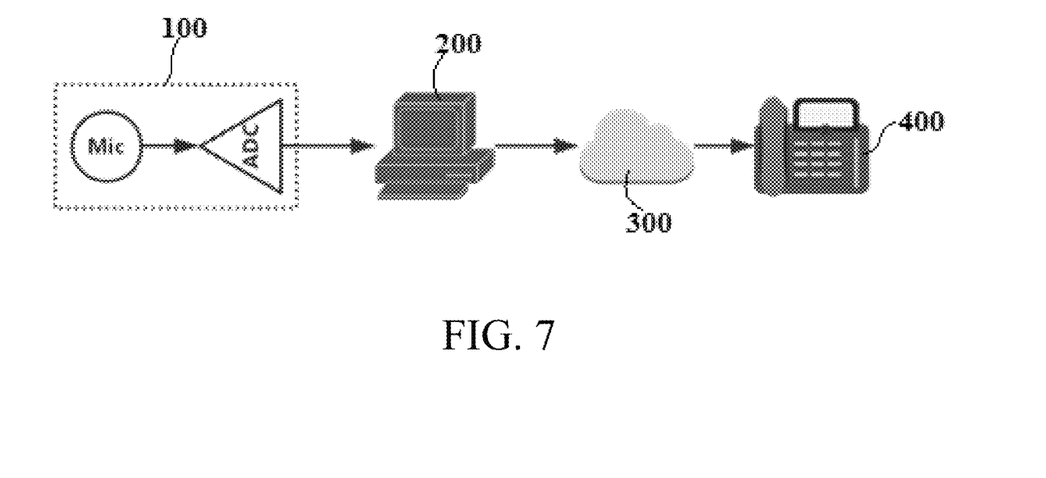
FIG. 7 is a schematic structural diagram of a voice endpoint detection system according to the present disclosure.

As shown in FIG. 7, a voice endpoint detection system according to the present disclosure includes a collecting unit 100, a calculating unit 200, a transmitting unit 300, and a terminal 400, the collecting unit 100 being electrically connected to the calculating unit 200, and the calculating unit 200 and the terminal 400 being respectively connected to the transmitting unit 300. In particular, the collecting unit 100 includes a sound collector and a signal converter, the sound collector being electrically connected to the signal converter, and the signal converter being electrically connected to the calculating unit 200. The sound collector is configured to collect a voice, and the signal converter is configured to convert an acoustic signal in an environment into a digital signal. In this embodiment, the sound collector is a microphone, and the signal converter is an analog to digital converter (ADC) hardware chip. The calculating unit 200 includes a memory and a processor, the memory storing a program for implementing the method for constructing a voice detection model, and the processor being configured to execute the program to obtain the voice detection model and calculate the voice detection model. In this embodiment, the calculating unit 200 is a single-chip computer or a computer. The transmitting unit 300 is configured to transmit data calculated by the calculating unit 200. In this embodiment, the transmitting unit 300 is a network system for transmitting data. The terminal 400 is configured to play processed audio data, and the terminal 400 is a real-time conference communication system connected to a network. In the voice endpoint detection system according to the present disclosure, voice data in the case of various types of noise has a high recognition rate, so that real-time communication can be achieved.

The present disclosure is described in detail above with reference to specific exemplary embodiments. However, it should be understood that various modifications and variations may be made without departing from the scope of the present disclosure as defined by the appended claims. The detailed descriptions and the accompanying drawings should only be considered as illustrative instead of limitative. Such modifications and variations shall fall within the scope of the present disclosure described herein. In addition, the background art is intended to explain the current status and significance of the research and development of this technology, and is not intended to limit the present disclosure or this application and the application field of the present disclosure.

What is claimed is:

1. A method for constructing a voice detection model, comprising:
    collecting audio data first and synthesizing a mixed voice, performing feature extraction on the mixed voice to obtain a 62-dimensional feature, and then inputting the 62-dimensional feature to a recurrent neural network (RNN) model for training to obtain a voice detection model.

2. The method for constructing a voice detection model according to claim 1, specifically comprising the following steps:
    Step 1. Mixed voice synthesis
    collecting a pure voice and noise first, and then synthesizing the collected pure voice and noise to obtain the mixed voice;
    Step 2. Feature extraction
    performing windowing and framing on the mixed voice first and performing short-time Fourier transform, calculating a frequency domain log spectrum of each frame, and then performing feature extraction on the log spectrum to obtain the 62-dimensional feature; and
    Step 3. Generation of the voice detection model
    inputting the 62-dimensional feature to the RNN model, and then using an Adam training strategy and an improved loss function for training to obtain the voice detection model, wherein the improved loss function is as follows:

$$BCE_{min}(x)_i = 0.1 \times MC(x) \times [-y_i \log f_i(x) + (1-y_i)\log(1-f_i(x))], \quad (5)$$

wherein $BCE_{min}(x)_i$ represents a binary cross entropy, $f_i(x)$ represents a predicted result, $y_i$ represents a true label, and MC(x) represents a minimum expected cost whose formula is as follows:

$$MC(x) = P(pre_{L0}, ture_{L1}, x) \times C10 + P(pre_{L1}, ture_{L0}, x) \times C0,$$

wherein in the formula, pre represents a predicted result; ture represents a true label; $P(pre_{L0}, ture_{L1}, x)$ represents a ratio of a number of true labels L1, predicted as L0, to a total number, L1 being a voice label, and L0 being a non-voice label; $P(pre_{L1}, true_{L0}, x)$ represents a ratio of a number of true labels L0, predicted as L1, to the total number; C10 is a cost when a true label L1 is detected as L0; and C0 is a cost when a true label L0 is detected as L1.

3. The method for constructing a voice detection model according to claim 1, wherein the RNN model comprises a Dense layer of 16 neurons and a gated recurrent unit (GRU) layer of 24 outputs.

4. The method for constructing a voice detection model according to claim 2, wherein a formula for voice synthesis in step 1 is as follows:

$$S_{mix} = \alpha \times S_{clean} + \beta \times N, \text{ wherein}$$

$S_{mix}$ represents the synthesized mixed voice; $S_{clean}$ represents the pure voice; N represents the noise; $\alpha$ represents an attenuation coefficient of the pure voice, $0.3 \leq \alpha \leq 1$; and represents an attenuation coefficient of the noise, $0.3 \leq \beta \leq 1$.

5. The method for constructing a voice detection model according to claim 2, wherein the performing feature extraction on the log spectrum in step 2 specifically comprises: dividing the log spectrum into 22 sub-bands evenly, performing discrete cosine transform (DCT) on each sub-band to obtain a 22-dimensional feature, comparing a data feature of a current frame with data features of previous two frames of the current frame and next two frames of the current frame according to the 22-dimensional feature to obtain a 36-dimensional feature according to the feature of the current frame, using a spectral distance difference calculated by using a pitch period, a spectral distance of the current frame, the current frame, and the previous two frames as features to obtain a 4-dimensional feature, and finally obtaining the 62-dimensional feature.

6. The method for constructing a voice detection model according to claim 2, wherein a formula for the Adam training strategy in step 3 is as follows:

$$m_t = \mu \times m_{t-1} + (1-\mu) \times g_t$$

$$n_t = \rho \times n_{t-1} + (1-\rho) \times g_t^2$$

$$\hat{m}_t = \frac{m_t}{1-\mu}$$

$$\hat{n}_t = \frac{n_t}{1-\rho}$$

$$\theta_{t+1} = \theta_t - \frac{\hat{m}_t}{\sqrt{\hat{n}_t} + \epsilon},$$

wherein $g_t$ represents a gradient; $m_t$ represents a first-order momentum of the gradient; $m_{t-1}$ represents a first-order momentum of the gradient at a moment $t-1$; $n_t$ represents a second-order momentum of the gradient; $n_{t-1}$ represents a second-order momentum of the gradient at the moment $t-1$; $\hat{m}_t$ represents a correction to $m_t$; $\hat{n}_t$ represents a correction to $n_t$; $\theta$ represents a learning rate; $\mu$ and $\rho$ represent attenuation coefficients, $0 \leq \mu \leq 1$, and $0 \leq \rho \leq 1$; and $\epsilon$ is a constant, $\epsilon = 10^{-8}$.

7. The method for constructing a voice detection model according to claim 4, wherein the RNN model comprises a Dense layer of 16 neurons and a gated recurrent unit (GRU) layer of 24 outputs.

8. The method for constructing a voice detection model according to claim 5, wherein coefficients of the first sixth frequency bands are used as a 6-dimensional feature for difference comparison, a calculation formula for difference comparison being as follows:

$$F1 = (f_{current}(i) + f_{current+1}(i) + f_{current+2}(i))/3$$

$$F2 = f_{current}(i) - f_{current+2}(i)$$

$$F3 = f_{current}(i) - 2 \times f_{current+1}(i) + f_{current+2}(i)$$

$$F4 = f_{current}(i) - f_{current-1}(i)$$

$$F5 = f_{current}(i) - f_{current-2}(i)$$

$$F6 = f_{current}(i), \text{ wherein}$$

$f_{current}$ represents the current frame; $f_{current+1}$ represents a next frame of the current frame; $f_{current+2}$ represents a next frame of $f_{current+1}$; $f_{current-1}$ represents a previous frame of the current frame; $f_{current-2}$ represents a previous frame of $f_{current-1}$; i represents an index corresponding to the 22-dimensional feature, $1 \leq i \leq 6$; F1 to F5 represent five difference comparison manners; and F6 represents the feature of the current frame.

9. The method for constructing a voice detection model according to claim 5, wherein the RNN model comprises a Dense layer of 16 neurons and a gated recurrent unit (GRU) layer of 24 outputs.

10. The method for constructing a voice detection model according to claim 8, wherein the RNN model comprises a Dense layer of 16 neurons and a gated recurrent unit (GRU) layer of 24 outputs.

11. The method for constructing a voice detection model according to claim 6, wherein the RNN model comprises a Dense layer of 16 neurons and a gated recurrent unit (GRU) layer of 24 outputs.

12. The method for constructing a voice detection model according to claim 2, wherein the RNN model comprises a Dense layer of 16 neurons and a gated recurrent unit (GRU) layer of 24 outputs.

13. A voice endpoint detection system, comprising a collecting unit, a calculating unit, a transmitting unit, and a terminal, the collecting unit being electrically connected to the calculating unit, and the calculating unit and the terminal being respectively connected to the transmitting unit, wherein the calculating unit comprises a memory and a processor, the memory storing a program for implementing the method for constructing a voice detection model according to claim 1, and the processor being configured to execute the program to obtain the voice detection model and calculate the voice detection model.

14. The system according to claim 13, wherein the collecting unit comprises a sound collector and a signal converter, the sound collector being electrically connected to the signal converter, and the signal converter being electrically connected to the calculating unit.

15. A voice endpoint detection system, comprising a collecting unit, a calculating unit, a transmitting unit, and a terminal, the collecting unit being electrically connected to the calculating unit, and the calculating unit and the terminal being respectively connected to the transmitting unit, wherein the calculating unit comprises a memory and a processor, the memory storing a program for implementing the method for constructing a voice detection model according to claim 2, and the processor being configured to execute the program to obtain the voice detection model and calculate the voice detection model.

16. The system according to claim 15, wherein the collecting unit comprises a sound collector and a signal converter, the sound collector being electrically connected to the signal converter, and the signal converter being electrically connected to the calculating unit.

* * * * *